United States Patent Office 2,734,031
Patented Feb. 7, 1956

2,734,031

LUBRICANTS CONTAINING POLYMERS OF CYCLOPENTADIENE

Thomas J. McNaughtan, Clarence, N. Y., assignor, by mesne assignments, to Hooker Electrochemical Company, Niagara Falls, N. Y., a corporation of New York No Drawing. Application November 19, 1952,
Serial No. 321,520

6 Claims. (Cl. 252—49.6)

This invention relates to new and useful lubricating compositions and more particularly to lubricating compositions having higher and better stabilized consistencies than the lubricating-type liquids contained in them.

By the term "lubricating-type liquid," as used in the present specification, is meant an organic liquid of oily nature such as petroleum base lubricating oil, vegetable oil, silicone oil, ester oils such as diamylphthalate and diamylsebacate, polyalkylene oxide oils, such as "Ucon" oil, and similar lubricating liquids.

It is known in the art that certain substances may be added to these lubricating-type liquids for the purpose of increasing and stabilizing their viscosity. Polymerized hydrocarbons such as polymerized styrene, indene and hydrogenated natural or synthetic rubbers are dissolved in lubricating oils in order to improve the viscosity, the pour point, and their stability. Sodium, calcium, lithium, and other metal salts of stearic, palmitic, oleic, and other fatty acids are incorporated into oils to make the common greases such as wheel bearing, cup, and similar greases. Inorganic substances such as very finely divided silica gel, and certain clays such as bentonites, are incorporated into lubricating oils to form greases of special properties. Fillers of a class intermediate between organic and inorganic are represented by the "Bentones."

Certain disadvantages are associated with each of these enumerated materials. Soap-based greases become liquefied at comparatively low temperatures, thereby losing their lubricating properties. The mineral-filled greases have been found to show abrasive properties in many applications. Common disadvantages of these two classes of greases are their tendency to break down in contact with water, and to allow the lubricating liquid to separate. All of them leave an inorganic residue when highly heated, and this is found to be undesirable in many applications. The inherently excellent electrical properties of the lubricating-type liquids are impaired by the addition of these inorganic materials, especially those which are electrolytes. Solutions of polymerized hydrocarbons in oils tend to impart a certain stickiness or tackiness to the oils which interferes in many cases with their uses.

Accordingly, it is a principal object of this invention to provide a lubricating composition of higher and better stabilized consistency than that of the lubricating-type liquid contained in it.

A further important object of the present invention is to provide a lubricating composition of the aforesaid type, the consistency of which is not affected by temperatures below those which affect the lubricating-type liquid contained in them.

A further object is to provide a lubricating composition which does not break down under the action even of boiling water, which is free of constituents of an abrasive nature, whose electrical properties are as good as those of the lubricating-type oil contained in it, and which leave no residual ash upon burning.

Cyclopentadiene can be polymerized to yield two distinctly different type polymers. These two products are described in "The Chemistry of Synthetic Resins" by Carlton Ellis, Rheinhold Publishing Corp., New York, N. Y. (1935), vol. 1, pages 186–188.

One type of polymer is formed by the action of various strong polymerizing agents such as stannic chloride, antimony pentachloride, boron trichloride, etc. upon cyclopentadiene. These polymers are rubber-like. They have the empirical formula $(C_5H_6)_n$ and a molecular weight varying between about 1260 and 6,670. They are unsaturated and contain one double bond per $C_5H_6$ unit.

The polymerized cyclopentadiene of the second type is formed essentially in the absence of catalysts and mostly under the influence of higher temperatures. These polymers are, up to the pentamer, crystalline solids and can be separated from one another by such means as vacuum distillation, solvent extractions, etc. In contrast to the first described type of polymer, they contain only two double bonds per molecule. The number of double bonds in a compound having the general formula $(C_5H_6)_n$ is therefore always less than $n$ when $n$ is greater than 2.

I have discovered, according to the present invention, that the second type polymer, namely the one having the general formula $(C_5H_6)_n$, in which less than $n$ double bonds are contained, forms an excellent additive to lubricating-type liquids, provided that $n$ is at least 3. It is possible to use either the individual chemical compounds, having the formulas $(C_5H_6)_4$ or $(C_5H_6)_5$ or $(C_5H_6)_6$ or mixtures of these, and/or higher polymerized compounds.

The polymers wherein $n$ is less than 6 are crystalline solids having a certain solubility in most lubricating-type liquids. When used as additives to lubricating-type liquids in low concentrations such as, for instance, 2 or 3%, they increase and stabilize the viscosity of such liquids without, however, causing them to gel. Incorporated into lubricating-type liquids at higher concentrations such as, for instance, 6–8%, they form greases of excellent lubricating properties, excellent electrical properties, excellent stability toward boiling water, complete freeness of ash, and other desirable properties, which, however, do melt under the influence of higher temperatures.

Polymers having the empirical formula $(C_5H_6)_6$ and those having a higher degree of polymerization are amorphous substances, unmeltable, not soluble in any known solvents and have an unmeasurably low vapor pressure. They are designated in the literature as "hexacyclopentadiene" although no evidence has been offered that these high polymers of cyclopentadiene are exclusively or even essentially the hexa polymer. "Hexacyclopentadiene" as used in the specification and claims is limited to amorphous substances which are higher polymers of cyclopentadiene and to which have been assigned the empirical formula: $(C_5H_6)_6$. Greases formed from these polymers possess the same advantages enumerated above in connection with the lower polymer greases but do not melt under the influence of higher temperatures.

Because the monomer and the individual polymers of cyclopentadiene can easily be converted into each other by the action of heat, any of the polymers to be used in this invention can be prepared from either the monomer or any of its polymers. A most accessible starting material for the preparation of the cyclopentadiene polymers is the commercially available dicyclopentadiene. This material contains from 60 to about 95% of cyclopentadiene, the remainder being hydrocarbons occurring in petroleum or coal tar distillates. Under the influence of heat, the commercial dicyclopentadiene depolymerizes as well as polymerizes, approaching an equilibrium containing the whole spectrum of polymers from the mono- to the "hexacyclopentadiene," the latter, as explained above, probably containing higher polymerizates also. The equilibrium between the cyclopentadiene polymers of different degree of polymerization can be approached in either direction from any of the individual polymers or their mixtures.

A method then of preparing the polymers to be used in this invention, consists of exposing dicyclopentadiene, either undiluted or diluted with such solvents as petroleum hydrocarbons, lubricating oils, tar hydrocarbons, or other suitable substances, to temperatures ranging from approximately 100° C. to approximately 300° C. for a sufficent period of time to approach the equilibrium among the polymers of cyclopentadiene corresponding to the selected temperature. This time ranges from a few minutes at very high temperatures to many hours at low temperatures. These polymers have the ability to reach equilibrium in both directions and consequently if only one of the polymers, for example, the pentamer is desired as an additive for lubricating liquids, the other polymers may be recycled in the process. The reaction mixture containing the polymers is cooled and the desired polymer is isolated from it by conventional means such as distillation, solvent extraction or similar means, as described in the literature. Example 1 describes one method of the preparation of "hexacyclopentadiene" in detail. The product of this example was an amorphous white powder of very low gravity and very fluffy nature.

It was observed that the ability of the "hexacyclopentadiene" to increase the consistency of lubricating-type liquids is closely parallel to its surface area as measured for example by the absorption of normal butane, at a temperature of 0° C. under a pressure of one-half atmosphere. Polymers showing, under these conditions, an absorption of 30 cc. or more of butane per gram of material formed a lubricating material of normal grease consistency when added to lubricating oil to the extent of 3 to 5%. High polymers, on the other hand, prepared at higher conversions and showing an absorption of only approximately 5 cc. of butane per gram, had to be added to the same lubricating oil to the extent of 20% in order to obtain the same consistency as that produced with 3 to 5% of the higher surface area polymer.

It was further observed that greases containing more than about 20% "hexacyclopentadiene" were somewhat impaired in their lubricating properties as compared with greases containing less than 20%. This can probably be explained by the material reduction of concentration of lubricating agent in such greases. For this reason, there would appear to exist a minimum of surface area required by the "hexacyclopentadienes" in order to enable them to produce first-class greases when added to lubricating oils. It would appear that this minimum is defined by a surface area corresponding to the absorption of about 5 cc. of butane per gram of high polymer as defined above, or by the corresponding requirement of approximately 20–25% addition of high polymer in order to produce a lubricating material having the consistency of a normal grease.

It was found that the lower the conversion of dicyclopentadiene into "hexacyclopentadiene" was kept, the higher was the resultant surface area of the "hexacyclopentadiene." That is to say, a dicyclopentadiene treated under conditions under which the reaction did not lead to more than, for instance, 15% conversion to high polymeric material, yields a high polymer having a higher surface than a preparation in which the concentration of the polymer reached 70–80%. High polymer recovered from preparations in which the content of high polymer went above 90% of the initial liquid present had a surface area so low as to make them, in general, undesirable as lubricant additives.

It was found, however, that if the polymerization of dicyclopentadiene was carried out in an aqueous suspension, the high polymer thus formed was suitable as a lubricant additive even if the conversions were driven to the highest attainable percentages.

The following examples are for the purpose of illustrating this invention and are not limiting to the scope thereof, which is set forth in the appended claims.

*Example 1*

Three samples of dicyclopentadiene having a freeze point of 36.7° C. were introduced into glass tubes. These tubes were evacuated, sealed and kept for certain lengths of time in a constant temperature oven at a temperature of 190° C. The tubes were removed, cooled and then opened. The contents of each tube were slurried with four times their weight of boiling toluene and filtered. The residue was slurried again in the same weight of boiling toluene and again filtered. This procedure was repeated a third time. Residual toluene was removed from the residue by extraction with acetone. This residue was then vacuum dried to constant weight.

The surface area of these polymers was obtained by measuring the volume of normal butane absorbed by a weighed quantity of polymer at 0° C. and 380 mm. Hg by using an apparatus essentially the same as that used in the measurement of surface area by the Brunauer-Emmett-Teller method.

These polymers were introduced into a U. S. P. heavy white medicinal oil to a percentage necessary to produce a grease that did not flow from a spatula heated in a Bunsen burner flame.

The following tabulated data represents the results obtained from the foregoing procedure:

| Hours Maintained at 190° C. | Percentage Conversion | Surface Area, cc. Butane/gr. at 0° C. and 380 mm. Hg | Percent Polymer in Grease |
|---|---|---|---|
| 24 | 1.2 | 15.2 | 10 |
| 67 | 10.0 | | 12 |
| 100 | 24.0 | | 20 |

As explained in the specification, an increase in conversion from 1.2 to 24% caused a decrease in the ability of the polymers to bind oil so that an increase from 10 to 20% polymer was necessary to produce a satisfactory grease.

*Example 2*

A commercial dicyclopentadiene containing 60% minimum of dicyclopentadiene was subjected to the same treatment as described in Example 1 above. The results are tabulated below as follows:

| Hours Maintained at 190° C. | Percentage Conversion | Surface Area, cc. Butane/gr. at 0° C. and 380 mm. Hg | Percent Polymer in Grease |
|---|---|---|---|
| 50 | 1.56 | 18.6 | 10 |
| 150 | 8.6 | 21.6 | 10 |
| 200 | 11.1 | 18.7 | 10 |

*Example 3*

Four grams of dicyclopentadiene having a freeze point of 32.6° C. was dissolved in 16 grams of "Silicone oil." "Silicone oil" is a product of Dow Chemical Company and is understood to consist essentially of a polymer of dimethylsilicon oxide. This mixture was subjected to a temperature of 190° C. for fifty hours and the high polymer was isolated as described above in connection with Example 1. The yield of "hexacyclopentadiene" was 2.94%. A grease made from a medicinal oil containing 10% of high polymer did not flow from a spatula when exposed to the flame of a Bunsen burner.

*Example 4*

2.00 grams of dicyclopentadiene having a freeze point of 32.8° C., 8.00 grams of distilled water, 0.11 gram of 2 - amino - 2 - methyl - 1 - propanol and 0.136 grams of oleic acid were heated for 100 hours at 190° C. in a sealed tube. 1.64 grams of "hexacyclopentadiene" was obtained, which corresponds to a yield of 82%. 15% of this polymer incorporated into a medicinal oil yielded a grease which did not flow when heated on a spatula in a Bunsen flame.

Example 5

75 grams of commercial 60% dicyclopentadiene was heated to 190° C. for 200 hours. Vacuum distillation at 10 mm. pressure gave about 15 grams of unchanged dicyclopentadiene distilling over at about 60° C., followed by 16.7 grams tricyclopentadiene distilling over at 190° C. Tricyclopentadiene was an oil solidifying at room temperature to a petrolatum gel-like consistency. The pressure was then lowered to 5 microns and 57.0 grams of tetracyclopentadiene distilled over at about 190° C. Tetracyclopentadiene was a white crystalline material having a melting point of 190° C. 7.5 grams of pentacyclopentadiene followed at 290° C. This was a white crystalline material melting at 290° C. 4 grams of "hexacyclopentadiene" remained as a bright yellow infusible still residue.

Greases were made by incorporating 10% of the tetramer and pentamer in some medicinal oil. The pour points of these oils were found to be 100° C. and 120° C., respectively. The trimer had grease-like properties itself with a pour point of 40° C.

Example 6

One gram of "hexacyclopentadiene," prepared according to the method described in Example 2, was incorporated into 9 grams each of: (1) "Ucon" oil ("Ucon" oil is an oil supplied by Linde Air Products Company and is understood to consist of polymers of ethylene and propylene oxides with terminal alkoxy group); (2) "Silicone oil" (described in Example 3); (3) Commercial SAE 40 lubricating oil; (4) Diamyl sebacate.

When each of the resultant greases was tested in a Bunsen burner flame, none of them showed flow and only the "Silicone oil" grease showed any residue or ash. None of these greases was affected by boiling water after a period of four hours.

Example 7

3% of pentacyclopentadiene produced as in Example 5 is incorporated into a lubricating oil of SAE 10 viscosity. This increases the viscosity of the oil considerably and produces an oil comparable to about an SAE 40 oil at room temperature. At 100° C. the viscosity of an SAE 10 oil drops to a very low value. SAE 10 oil including 3% of pentacyclopentadiene maintains a viscosity of approximately an SAE 40 oil at 100° C.

Example 8

3% of "hexacyclopentadiene" as produced in Example 1 is incorporated into a lubricating oil of SAE 10 viscosity. This produces a relatively viscous oil. When this oil is heated to 350° C. there is no appreciable change in its viscosity. However, when heating SAE 10 oil with no "hexacyclopentadiene" to 350° C. a water thin liquid results.

Example 9

6% of "hexacyclopentadiene" as produced in Example 1 is incorporated into a lubricating oil of SAE 10 viscosity. As a result, the oil is gelled and forms a thin grease. The viscosity of this grease does not change appreciably upon heating to 350° C.

I claim:

1. A lubricating composition comprising an organic lubricating liquid of oily nature and a polymer of cyclopentadiene having the empirical formula of $(C_5H_6)_n$ in which $n$ is a figure of at least 3 and wherein there are two double bonds, the per cent by weight of polymer present based on the weight of the organic lubricating liquid of oily nature in the composition being sufficient to increase and stabilize the viscosity of the organic liquid but not more than 25% by weight thereof.

2. A lubricating composition comprising an organic lubricating liquid of oily nature and a mixture of polymers of cyclopentadiene having the empirical formula of $(C_5H_6)_n$ in which $n$ is a figure of at least 3 and wherein there are two double bonds, the per cent by weight of the polymers present based on the weight of the organic lubricating liquid of oily nature in the composition being sufficient to increase and stabilize the viscosity of the organic liquid but not more than 25% by weight thereof.

3. A lubricating composition comprising an organic lubricating liquid of oily nature and a polymer of cyclopentadiene having the empirical formula of $(C_5H_6)_n$ in which $n$ is a figure of at least 6 and wherein there are two double bonds, the per cent by weight of polymer present based on the weight of the organic lubricating liquid of oily nature in the composition being sufficient to increase and stabilize the viscosity of the organic liquid but not more than 25% by weight thereof.

4. A lubricating composition comprising an organic lubricating liquid of oily nature and a mixture of polymers of cyclopentadiene having the empirical formula of $(C_5H_6)_n$ in which $n$ has an average value of at least 6 and wherein there are two double bonds, the per cent by weight of the polymers present based on the weight of the organic lubricating liquid of oily nature in the composition being sufficient to increase and stabilize the viscosity of the organic liquid but not more than 25% by weight thereof.

5. A lubricating composition comprising an organic lubricating liquid of oily nature and a polymer of cyclopentadiene having the empirical formula of $(C_5H_6)_n$ in which $n$ is a figure of at least 3 but less than 6 and wherein there are two double bonds, the per cent by weight of polymer present based on the weight of the organic lubricating liquid of oily nature in the composition being sufficient to increase and stabilize the viscosity of the organic liquid but not more than 25% by weight thereof.

6. A lubricating composition comprising an organic lubricating liquid of oily nature and a mixture of polymers of cyclopentadiene having the empirical formula of $(C_5H_6)_n$ in which $n$ has an average value of at least 3 but less than 6 and wherein there are two double bonds, the per cent by weight of the polymers present based on the weight of the organic lubricating liquid of oily nature in the composition being sufficient to increase and stabilize the viscosity of the organic liquid but not more than 25% by weight thereof.

References Cited in the file of this patent

UNITED STATES PATENTS

| | | |
|---|---|---|
| 2,122,826 | Peski | July 5, 1938 |
| 2,406,575 | Young | Aug. 27, 1946 |
| 2,439,610 | Morris | Apr. 13, 1948 |
| 2,542,286 | Morris | Feb. 20, 1951 |

OTHER REFERENCES

Ind. and Eng. Chem., vol. 18, No. 4, pages 381–383; page 381 pertinent.